United States Patent
Marin et al.

(10) Patent No.: US 9,561,468 B2
(45) Date of Patent: Feb. 7, 2017

(54) METHOD AND SYSTEM FOR THE PURIFICATION OF EXHAUST GAS FROM AN INTERNAL COMBUSTION ENGINE

(75) Inventors: Manuel Moliner Marin, Valencia (ES); Cristina Franch Marti, Moncofa (ES); Antonio Eduardo Palomares Gimeno, Valencia (ES); Avelino Corma Canós, Valencia (ES); Peter N. R. Vennestrøm, Copenhagen S (DK); Marie Grill, Frederiksberg C (DK); Arkady Kustov, Frederiksberg C (DK); Joakim Reimer Thøgersen, Virum (DK)

(73) Assignee: Haldor Topsoe A/S, Lyngby (DK)

(*) Notice: Subject to any disclaimer, the term of this patent is extended or adjusted under 35 U.S.C. 154(b) by 0 days.

(21) Appl. No.: 14/391,926

(22) PCT Filed: Apr. 27, 2012

(86) PCT No.: PCT/EP2012/057795
§ 371 (c)(1),
(2), (4) Date: Oct. 10, 2014

(87) PCT Pub. No.: WO2013/159825
PCT Pub. Date: Oct. 31, 2013

(65) Prior Publication Data
US 2015/0118134 A1    Apr. 30, 2015

(51) Int. Cl.
| | | |
|---|---|---|
| *B01D 53/94* | (2006.01) | |
| *F01N 3/10* | (2006.01) | |
| *F01N 3/28* | (2006.01) | |
| *F01N 3/20* | (2006.01) | |
| *F01N 3/035* | (2006.01) | |
| *B01J 37/02* | (2006.01) | |
| *B01J 29/76* | (2006.01) | |
| *B01J 29/85* | (2006.01) | |
| *B01J 35/10* | (2006.01) | |

(52) U.S. Cl.
CPC ....... *B01D 53/9418* (2013.01); *B01D 53/9431* (2013.01); *B01J 29/76* (2013.01); *B01J 29/85* (2013.01); *B01J 37/0246* (2013.01); *F01N 3/035* (2013.01); *F01N 3/2066* (2013.01); B01D 2251/206 (2013.01); B01D 2255/20761 (2013.01); B01D 2255/50 (2013.01); B01D 2255/915 (2013.01); B01D 2257/404 (2013.01); B01D 2258/012 (2013.01); *B01J 35/1019* (2013.01); *B01J 35/1038* (2013.01); *B01J 2229/20* (2013.01); *F01N 2330/06* (2013.01); *F01N 2370/04* (2013.01); *F01N 2610/02* (2013.01); *Y02T 10/24* (2013.01)

(58) Field of Classification Search
CPC ...... F01N 3/2066; F01N 3/035; F01N 3/0232; F01N 3/0222; F01N 3/021; B01D 53/9409; B01D 53/9413; B01D 53/9431
See application file for complete search history.

(56) References Cited

U.S. PATENT DOCUMENTS

| | | | | |
|---|---|---|---|---|
| 8,603,432 B2 * | 12/2013 | Andersen | ........... | B01D 53/9418 423/210 |
| 2009/0196812 A1 * | 8/2009 | Bull | ................ | B01D 53/9418 423/239.1 |
| 2010/0267548 A1 | 10/2010 | Andersen et al. | | |
| 2011/0165040 A1 * | 7/2011 | Huang | ................ | B01D 53/9472 422/616 |
| 2015/0238947 A1 * | 8/2015 | Casci | .................... | B01J 29/7615 502/66 |
| 2016/0038876 A1 * | 2/2016 | Andersen | ........... | B01D 53/8628 422/171 |

FOREIGN PATENT DOCUMENTS

| | | | | |
|---|---|---|---|---|
| CN | 1495126 A | 5/2004 | | |
| EP | 2786796 A1 * | 10/2014 | ......... | B01D 53/9418 |
| EP | 2150328 B1 * | 3/2015 | ......... | B01D 53/9418 |
| WO | WO 2008/118434 A1 | 10/2008 | | |
| WO | WO 2008/132452 A2 | 11/2008 | | |
| WO | WO 2011/112949 A1 | 9/2011 | | |

* cited by examiner

Primary Examiner — Timothy Vanoy
(74) Attorney, Agent, or Firm — Blank Rome LLP

(57) ABSTRACT

The invention provides a method and system for the purification of exhaust gas from an internal combustion engine, comprising a filter and a SCR catalyst. The filter is periodically regenerated increasing the temperature of the exhaust gas up to 850° C. and the water vapor content up to 100% by volume. The SCR catalyst comprises a hydrothermally microporous stable zeolite and/or zeotype having the AEI type framework and being promoted with copper.

6 Claims, 4 Drawing Sheets

METHOD AND SYSTEM FOR THE PURIFICATION OF EXHAUST GAS FROM AN INTERNAL COMBUSTION ENGINE

BACKGROUND OF THE INVENTION

1. Field of the Invention

The present invention relates to after treatment of exhaust gas from an internal combustion engine in terms of removal or reduction of harmful compounds. More particularly, the invention focus on removal of particulate matter and reduction of nitrogen oxides in engine exhaust from lean burn internal combustion engines, and in particular diesel engines.

2. Description of the Related Art:

Lean burn engines are known to be energy efficient, but have the disadvantage of forming particulate matter and nitrogen oxides, which must be removed or at least reduced in the engine exhaust.

To prevent environmental pollution and to fulfil several governmental requirements, modern diesel engines are provided with an exhaust gas cleaning system comprising in series an oxidation catalyst for the removal of volatile organic compounds, a particulate filter for the removal of particulate matter and a catalyst being active in the selective reduction of nitrogen oxides (NOx).

It is also known to integrate the SCR catalyst into the particulate filter.

Selective catalytic reduction of NOx in exhaust gas is usually accomplished by reaction with ammonia introduced as such or as a precursor thereof, which is injected into the exhaust gas upstream of the SCR catalyst for the selective reduction of nitrogen oxides, mainly nitrogen dioxide and nitrogen monoxide (NOx), to nitrogen.

For this purpose numerous catalyst compositions are disclosed in the literature.

Lately, zeolites promoted with copper or iron, have found great interest, particularly for use in automotive application.

Copper containing zeolite catalysts for $NH_3$-SCR applications have shown high activity at low temperature. However, in certain applications the catalyst can be exposed to high temperature excursions in exhaust gases. Furthermore the exhaust gas contains high concentrations of water vapour from the combustion engine, which can deteriorate the zeolite catalyst performance. The hydrothermal stability is often an issue for Cu-based zeolites catalysts as one possible catalyst deactivation mechanism is the degradation of the zeolite framework due to its instability towards hydrothermal conditions, which is furthermore enhanced by the presence of copper.

Deactivation of copper containing zeolite catalysts in $NH_3$-SCR applications is typically caused by degradation of the zeolite framework due to its instability towards hydrothermal conditions, which is furthermore enhanced by the presence of copper. However the stability is especially important for automotive applications in which the catalyst will experience high temperature excursions in an exhaust stream containing water.

Deactivation of the catalyst is in particular a problem in exhaust gas cleaning systems provided with a particulate filter, which must periodically be actively regenerated in order to prevent build up of pressure over the soot laden filter.

Active regeneration is performed by burning of captured soot. The regeneration can be initiated by injection of fuel into the exhaust gas upstream the oxidation catalyst or by electrical heating of the particulate filter.

During the active regeneration exhaust gas temperature at outlet of the filter can reach more than 850° C. and a content of water vapour more than 15% and up to 100% for periods of time between 10 and 15 minutes depending on the amount of soot captured in the filter.

SUMMARY OF THE INVENTION

It is the general object of the invention to provide a method for the removal of harmful compounds lean burn internal combustion engines, such as particulate matter by means of a particulate filter and nitrogen oxides by selective catalytic reduction of nitrogen oxides in contact with catalyst being hydrothermally stable when exposed to high temperatures and water vapour concentration during active regeneration of the particulate filter.

We have found that the object of the invention can be achieved by using a zeolite or zeotype having hydrothermally stable AEI type framework, in which the structure is preserved under hydrothermal aging conditions even when copper is present in the zeolite or zeotype.

Pursuant to the above finding, this invention provides a method for the purification of exhaust gas from an internal combustion engine, comprising reducing the content of soot in the exhaust gas by passing the gas through a particulate filter;

subsequently reducing the content of nitrogen oxides in presence of ammonia or a precursor thereof by contact with a catalyst being active in NH3-SCR;

periodically regenerating the filter by burning of soot captured in the filter and thereby increasing temperature of the exhaust gas up to 850° C. and water vapour content up to 100% by volume; and passing the exhaust gas from the filter through the catalyst during the regeneration of the filter, wherein the catalyst comprises a hydrothermally stable zeolite and/or zeotype having an AEI type framework and copper incorporated in the framework.

"Hydrothermally stable" means that the zeolite and zeotype catalyst have the ability to retain at least 80 to 90% of initial surface area and 80 to 90% microporous volume after exposure to temperatures of at least 600° C. and a water vapour content up to 100 volume % for 13 hours, and at least 30 to 40% of initial surface area and micropore volume after exposure to temperatures of at least 750° C. and a water vapour content up to 100 volume % for 13 hours.

Preferably, the hydrothermally stable zeolite or zeotype with an AEI type framework has an atomic ratio of silicon to aluminium between 5 and 50 for the zeolite or between 0.02 and 0.5 for the zeotype.

The most preferred zeolite or zeotype catalysts for use in the invention are zeolite SSZ-39 and zeotype SAPO-18 both having the "AEI" framework structures, in which copper is introduced by impregnation, liquid ion exchange or solid ion exchange.

The atomic copper to aluminium ratio is preferred to be between about 0.01 and about 1 for the zeolite. For the zeotype the preferred atomic copper to silicon ratio is correspondingly between 0.01 and about 1.

By means of the above catalysts employed in the invention, 80% of the initial NOx reduction is maintained at 250° C. after aging at 750° C. as compared to 20% for a Cu-CHA catalyst.

Thus, in an embodiment of the invention, 80% of the initial reduction of nitrogen oxides at 250° C. is maintained after the catalyst has been exposed to a temperature of 750° C. and a water vapour content of 100% in the exhaust gas for 13 hours.

The invention provides in addition an exhaust gas cleaning system, comprising an active regenerable particulate filter and an SCR catalyst comprising a hydrothermally microporous stable zeolite and/or zeotype having the AEI type framework and being promoted with copper.

In an embodiment of the exhaust gas cleaning system according to the invention, the SCR catalyst is integrated into the particulate filter.

In further an embodiment, the atomic copper to aluminium ratio is between about 0.01 and about 1 for the zeolite and the atomic copper to silicon ratio is between 0.01 and about 1 for the zeotype.

In still an embodiment, the atomic ratio of silicon to aluminium in the SCR catalyst is between 5 and 50 for the zeolite and between 0.02 and 0.5 for the zeotype.

In a further embodiment, the SCR catalyst retains 80% of the initial reduction of nitrogen oxides at 250° C. after the catalyst has been exposed to a temperature of 750° C. and a water vapour content of 100% in the exhaust gas for 13 hours.

In a further embodiment, the SCR catalyst retains 80 to 90% of the initial microporosity after aging at 600° C., and 30 to 40% of the initial microporosity after aging at 750° C.

In still an embodiment, the SCR catalyst is an aluminosilicate zeolite SSZ-39 and/or silicoaluminum phosphate SAPO-18.

In the above embodiments, the SCR catalyst can be deposited on a monolithic support structure.

DETAILED DESCRIPTION OF THE PREFERRED EMBODIMENTS

The Cu-SSZ-39 catalyst system has shown an improved performance compared to the typical "state-of-the-art" Cu-SSZ-13 when similar Si/Al ratios are compared.

Example 1

Cu-SSZ-39 Catalyst Preparation

The zeolite SSZ-39 with the framework type code AEI was synthesized in a similar way as given in U.S. Pat. No. 5,958,370 using 1,1,3,5-tetramethylpiperidinium as the organic template. A gel with the following composition: 30 Si:1.0 Al:0.51 NaOH:5.1 OSDA:600 $H_2O$, was autoclaved at 135° C. for 7 days, the product filtered, washed with water, dried and calcined in air. The final SSZ-39 had a Si/Al=9.1 measured by ICP-AES.

To obtain the Cu-SSZ-39 the calcined zeolite was ion exchanged with $Cu(CH_3COO)_2$ to obtain the final catalyst with a Cu/Al=0.52 after calcination.

Figure 1A:
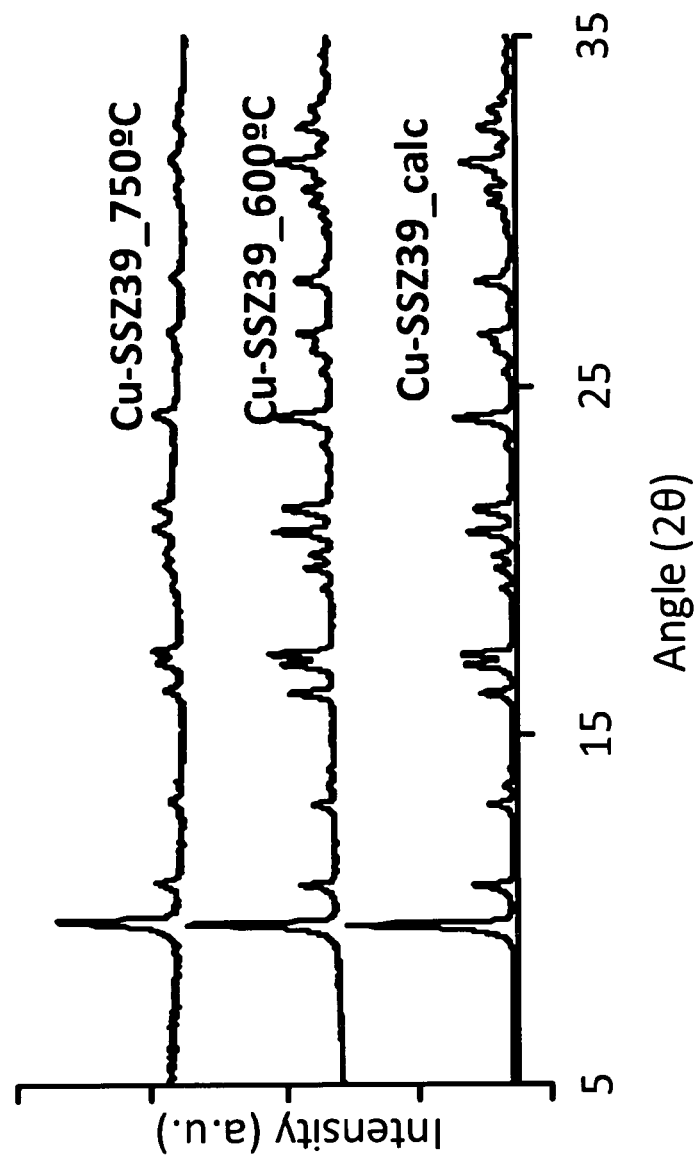
FIG. 1A shows the powder X-ray diffraction (PXRD) pattern of treated Cu-SSZ-39 samples.
Figure 1B:
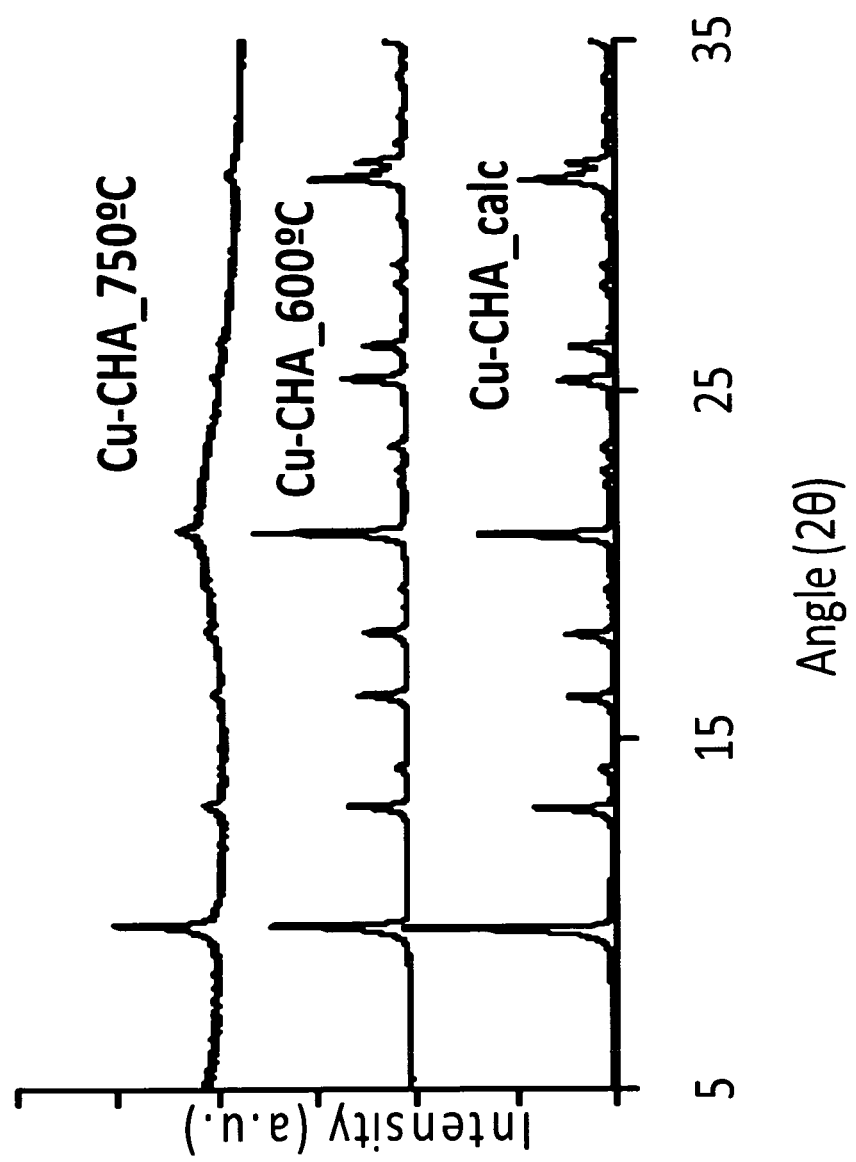
FIG. 1B shows the powder X-ray diffraction (PXRD) pattern of treated CHA samples.

The powder X-ray diffraction (PXRD) pattern of Cu-SSZ-39 after calcination is shown in FIG. 1.

Example 2

Catalytic Testing

The activity of the samples for the selective catalytic reduction of $NO_x$ was tested in a fixed bed reactor to simulate an engine exhaust stream using a total flow rate of 300 mL/min consisting of 500 ppm NO, 533 ppm $NH_3$, 7% $O_2$, 5% $H_2O$ in $N_2$ in which 40 mg catalyst was tested.

Figure 2:
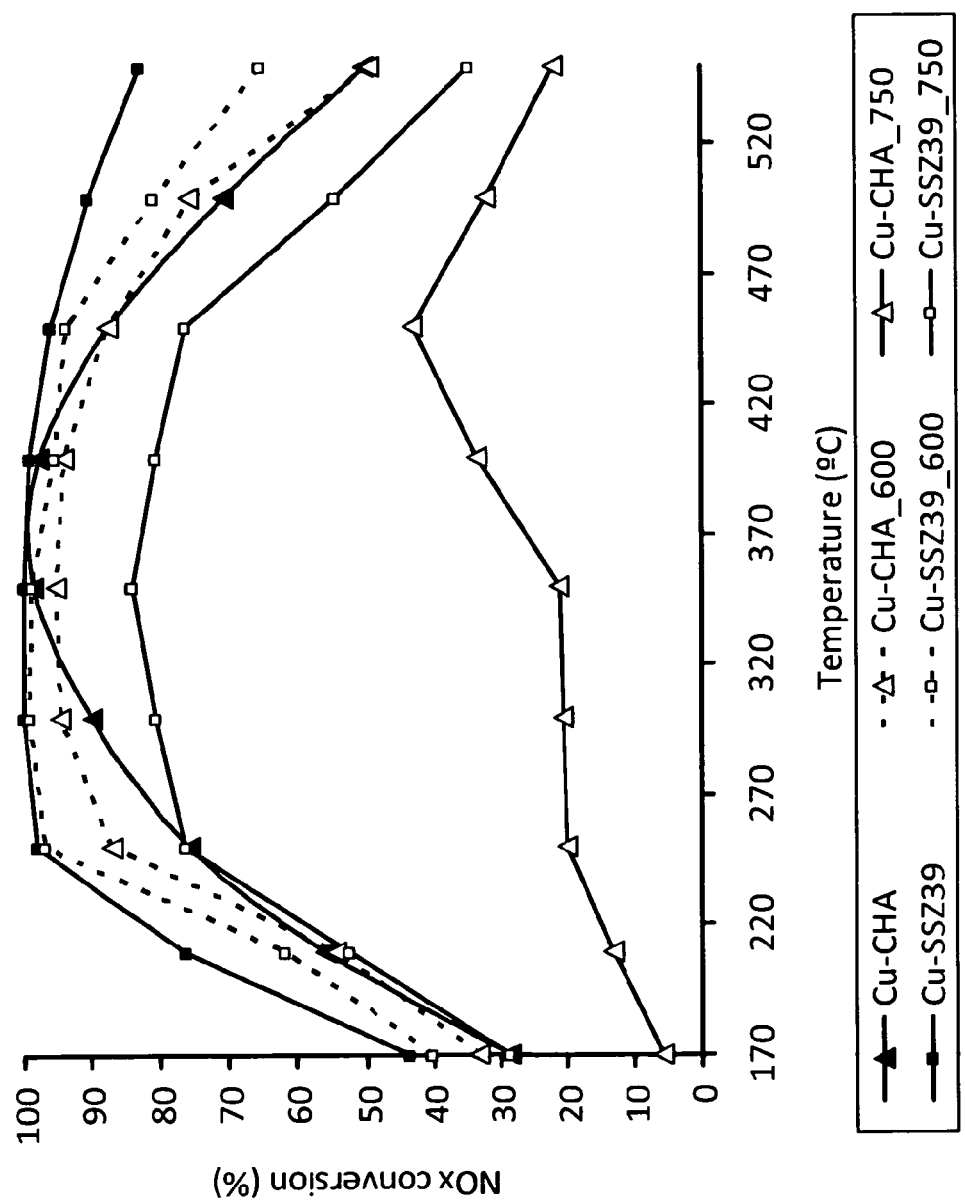
FIG. 2 is a summary of the results of Examples 1-4 with the Cu-SSZ-39 and CHA catalysts.
Figure 3:
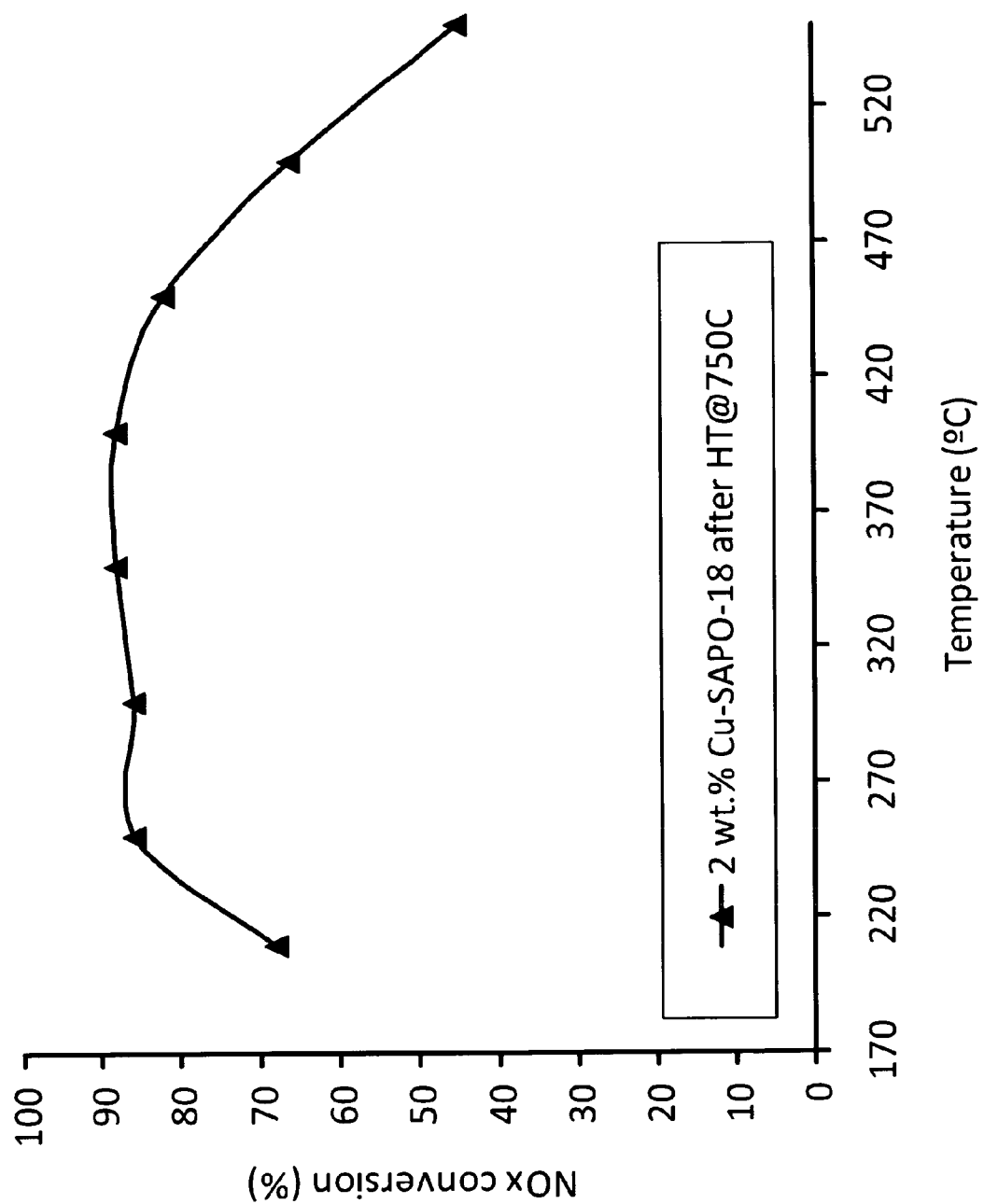
FIG. 3 shows the results of Example 5 with the Cu-SSZ-39 catalyst.

The $NO_x$ present in the outlet gases from the reactor were analyzed continuously and the conversion is shown in FIG. 2.

Example 3

Test of Hydrothermal Durability

In order to test the hydrothermal stability of the zeolites, steaming treatments were done to the samples. They were exposed to a water feed (2.2 mL/min) at 600 or 750° C. during 13 hours in a conventional oven and afterwards tested similarly to Example 2.

The catalytic results can also be seen in FIG. 2. The samples that underwent a hydrothermal treatment have been marked with 600 or 700° C., depending on the temperature used during the hydrothermal treatment.

Additional characterization has also been performed to all treated samples. PXRD patterns after hydrothermal treatments are shown in FIG. 1, and BET surface areas, micropore areas, and micropore volumes of treated samples are summarized in Table 1 below.

Example 4

Comparative Example with Cu-CHA (Cu-SSZ-13)

A Cu-CHA zeolite was prepared from a gel with the molar composition: $SiO_2$:0.033 $Al_2O_3$:0.50 OSDA:0.50 HF:3 $H_2O$, where the OSDA is N,N,N-trimethyl-1-adamantamonium hydroxide.

The gel was autoclaved at 150° C. for 3 days under tumbling to give a final zeolite product with a Si/Al=12.7 after washing, drying and calcination.

To obtain the Cu-CHA the calcined zeolite was ion exchanged with $Cu(CH_3COO)_2$ to obtain the final catalyst with a Cu/Al=0.54.

The powder X-ray diffraction (PXRD) pattern of Cu-CHA after calcination is shown in FIG. 1.

This catalyst was also tested according to example 2, and the hydrothermal durability evaluated similarly to example 3. The catalytic results are summarized in FIG. 2 of the drawings. PXRD patterns of treated-CHA samples are shown in FIG. 1, and textural properties (BET surface area, micropore volume, and micropore area) are summarized on Table 1.

TABLE 1

| Sample | BET surface area ($m^2/g$) | Micropore area ($m^2/g$) | Volume micropore ($cm^3/g$) |
| --- | --- | --- | --- |
| SSZ-39_Calc | 571 | 568 | 0.28 |
| SSZ-39_600° C. | 554 | 551 | 0.28 |

TABLE 1-continued

| Sample | BET surface area (m²/g) | Micropore area (m²/g) | Volume micropore (cm³/g) |
|---|---|---|---|
| SSZ-39_750° C. | 565 | 563 | 0.28 |
| Cu-SSZ-39_600° C. | 465 | 463 | 0.24 |
| Cu-SSZ-39_750° C. | 158 | 152 | 0.09 |
| CHA_calc | 675 | 637 | 0.32 |
| CHA_600° C. | 687 | 645 | 0.32 |
| CHA_750° C. | 674 | 623 | 0.31 |
| Cu-CHA_600° C. | 633 | 585 | 0.29 |
| Cu-CHA_750° C. | 50 | 35 | 0.02 |

Example 5

Cu-SAPO-18

Silicoaluminophosphate SAPO-18 with the framework type code AEI was synthesized according to [J. Chen, J. M. Thomas, P. A. Wright, R. P. Townsend, Catal. Lett. 28 (1994) [241-248] and impregnated with 2 wt. % Cu. The final Cu-SAPO-18 catalyst was hydrothermally treated in 10% $H_2O$ and 10% $O_2$ at 750° C. and tested under the same conditions as given in Example 2. The results are shown in FIG. 2 of the drawings.

The invention claimed is:

1. Method for the purification of exhaust gas from an internal combustion engine, comprising
   reducing the content of soot in the exhaust gas by passing the gas through a filter;
   subsequently reducing the content of nitrogen oxides in presence of ammonia or a precursor thereof in contact with a catalyst being active in $NH_3$-SCR;
   periodically regenerating the filter by burning of soot captured in the filter and thereby increasing temperature of the exhaust gas up to 850° C. and water vapour content up to 100% by volume; and
   passing the exhaust gas from the filter through the catalyst during the regeneration of the filter, wherein the catalyst comprises a hydrothermally microporous stable zeolite and/or zeotype having the AEI type framework and being promoted with copper, and maintains 80% of the initial reduction of nitrogen oxides at 250° C. after the catalyst has been exposed to a water vapour content of 100% in the exhaust gas for 13 hours.

2. The method of claim 1, wherein the atomic copper to aluminium ratio is between about 0.01 and about 1 for the zeolite and the atomic copper to silicon ratio is between 0.01 and about 1 for the zeotype.

3. The method of claim 1, wherein the atomic ratio of silicon to aluminium is between 5 and 50 for the zeolite and between 0.02 and 0.5 for the zeotype.

4. The method of claim 1, wherein 80% of the initial reduction of nitrogen oxides at 250° C. is maintained after the catalyst has been exposed to a temperature of 750° C.

5. The method of claim 1, wherein at least 80 to 90% of the initial microporosity is maintained after aging at 600° C., and at least 30 to 40% is maintained after aging at 750° C.

6. The method of claim 3, wherein the catalyst is an aluminosilicate zeolite SSZ-39 and/or silicoaluminum phosphate SAPO-18.

* * * * *